United States Patent [19]
Rao et al.

[11] 3,891,613

[45] June 24, 1975

[54] PROCESS FOR SEPARATION OF WHOLE WHEAT KERNEL COMPONENTS TO ISOLATE THE GLUTEN EMPLOYING WATER

[75] Inventors: Ganta V. Rao; Oliver B. Gerrish, Sr., both of Hutchinson, Kans.

[73] Assignee: Far-Mar-Co., Inc., Hutchinson, Kans.

[22] Filed: Nov. 20, 1972

[21] Appl. No.: 307,869

[52] U.S. Cl. ............. 260/112 G; 426/436; 426/518
[51] Int. Cl. ................................................ A23j 1/12
[58] Field of Search ............ 426/455, 482, 507, 208; 260/112 G

[56] References Cited
UNITED STATES PATENTS

| | | |
|---|---|---|
| 2,388,902 | 11/1945 | Callaghan et al. ............... 260/112 G |
| 2,504,962 | 4/1950 | Burdick ............................ 260/112 G |
| 2,961,353 | 11/1960 | Carlson et al. ................... 260/112 G |
| 3,790,553 | 2/1974 | Rao et al. ......................... 260/112 G |

*Primary Examiner*—Howard E. Schain
*Attorney, Agent, or Firm*—Clarence A. O'Brien; Harvey B. Jacobson

[57] ABSTRACT

A process for separating wheat gluten from the other components of the whole wheat kernel includes the steps of tempering the wheat kernel in water, flaking the wheat kernel, hydrating and agitating the flakes to just saturate the flakes and to form a thick, dough-like mass and mechanically working the dough-like mass in the presence of water to wash the wheat kernel components from the gluten.

6 Claims, 2 Drawing Figures

PROCESS FOR SEPARATION OF WHOLE WHEAT KERNEL COMPONENTS TO ISOLATE THE GLUTEN EMPLOYING WATER

BACKGROUND OF THE INVENTION

1. Field of the Invention

The present invention relates to vital wheat gluten and, more particularly, to a process of separating vital wheat gluten from the other components of the whole wheat kernel.

2. Description of the Prior Art

Vital wheat gluten is a proteinaceous material used in the food industry primarily as an ingredient in bakery products. Other representative uses include cereals, pasta products, dietary foods, and specialty products. These uses depend on the ability of gluten to hydrate rapidly into a cohesive elastic mass.

The commercial production of vital wheat gluten has been accomplished in the past using wheat flour or second clears as the starting material by the "dough ball" process and modifications thereof, which processes essentially separate the wheat starch from the gluten protein. In one process, the gluten is maintained as a single coherent mass and the starch is washed out of a flour and water dough. Another process disperses the dough in water and recovers the gluten particles on a screen. Variations of the basic "dough ball" process utilizing wheat flour account for all of the vital gluten produced commercially today.

No known gluten production process employs the whole wheat kernel as the starting material. This is probably because production of vital wheat gluten is a comparatively recent innovation which developed from starch recovery processes. Early starch recovery processes utilized the whole wheat kernel but could not be converted to gluten production because the process conditions were sufficiently harsh to destroy or devitalize the gluten. On the other hand, dough ball or batter processing from wheat flour was relatively simple because the bran and the germ had been substantially removed in the milling process. In addition, high ash clear flour worked well in the "dough ball" process and was available at attractive prices as a by-product of the flour milling industry. Consequently, wheat gluten processing has been flour oriented for decades and no need has apparently existed to motivate the development of a process starting from the whole wheat kernel.

However, improvements in milling techniques coupled with a drastic decline in the number of operative flour mills has led to current shortages of and higher prices for clears. In fact, millions of pounds of vital wheat gluten are imported by the United States each year to meet demands domestic producers cannot fill.

SUMMARY OF THE INVENTION

It is, therefore, an object of the present invention to provide a vital wheat gluten recovery process which utilizes the whole wheat kernel as the starting material.

It is another object of the present invention to provide a process for separating gluten from wheat starch and the other whole wheat kernel components which process utilizes the whole wheat kernel as the starting material.

Other objects and advantages will become apparent from the following description and appended claims.

Briefly stated, in accordance with the aforesaid objects, the present invention provides a process for separating wheat gluten from the other components of the whole wheat kernel which includes tempering and flaking the whole wheat kernel, hydrating and agitating the flakes in a limited quantity of water just sufficient to achieve saturation of the flakes, and mechanically working the resulting mass in the presence of water to separate and wash away the non-gluten components of the whole wheat kernel. A critical aspect of this process is controlling the water quantity used to saturate the flakes to assure that a thick mass, rather than a thin slurry, results. Generally, the addition of a quantity of water from 65 to 75% by weight of the flakes to be hydrated will assure that the resulting mass is suitable for effective whole wheat kernel component separation.

BRIEF DESCRIPTION OF THE DRAWINGS

The invention will be better understood from the following description taken in conjunction with the accompanying drawings.

DETAILED DESCRIPTION OF THE INVENTION

The present process is directed primarily to the separation of vital wheat gluten from the whole wheat kernel instead of from wheat flour, as is presently the practice. Aside from considerations of availability, there are a number of distinct advantages incident to starting from the whole wheat kernel. Essentially all of the gluten in the wheat is recoverable from the whole wheat kernel, while processing of wheat flour, by its nature, can recover only the gluten in the by-product clears. Moreover, the whole wheat kernal offers a stable supply of raw material with dependable and predictable physical and chemical characteristics. On the other hand, wheat flour is a by-product of differing milling techniques and is neither a uniform nor a stable raw material. In addition, processing the whole wheat kernel produces a greater yield of high quality gluten per bushel of wheat processed.

The first step of the present process comprises tempering or hydrating the whole wheat kernel in water with intermittent mixing to achieve a kernel moisture content in the range, by weight, from about 15% to saturation. Unprocessed whole wheat kernels have a moisture content generally in the range from about 11.2 to 14%. The saturation moisture level depends upon the characteristics of the kernel and, at room temperature, is generally in the range from about 45 to 55%. Tempering (or hydrating) in accordance with the present process involves immersing the kernels in water for a period of time sufficient to allow the kernels to take-up the necessary water to reach the desired moisture content. It is preferred, although not required, to temper (or hydrate) the kernels in precisely the amount of water necessary to reach the desired water content. This avoids loss of water soluble protein, particularly from the bran, which could remain in any left-over tempering water. Tempering (or hydrating) is a relatively slow process, it having been found that immersion of the kernels in water at room temperature, i.e. about 68° F., requires about 12–24 hours to reach saturation. However, the tempering (hydrating) rate can be increased by heating. If the tempering (hydrating) solution is heated, care must be exercised to maintain the temperature below a value where the gluten may become damaged. Gluten damage will occur at about 140° F. or, after prolonged heating, at temperatures about 120° F. For purposes of clarity, the term "tempering" will be used herein to denote a process by which the moisture content of the kernel is increased by only a limited amount, less than saturation. On the other hand, the term "hydrating" will hereinafter be limited to a process for increasing kernel or flake moisture content to saturation.

Figure 1:
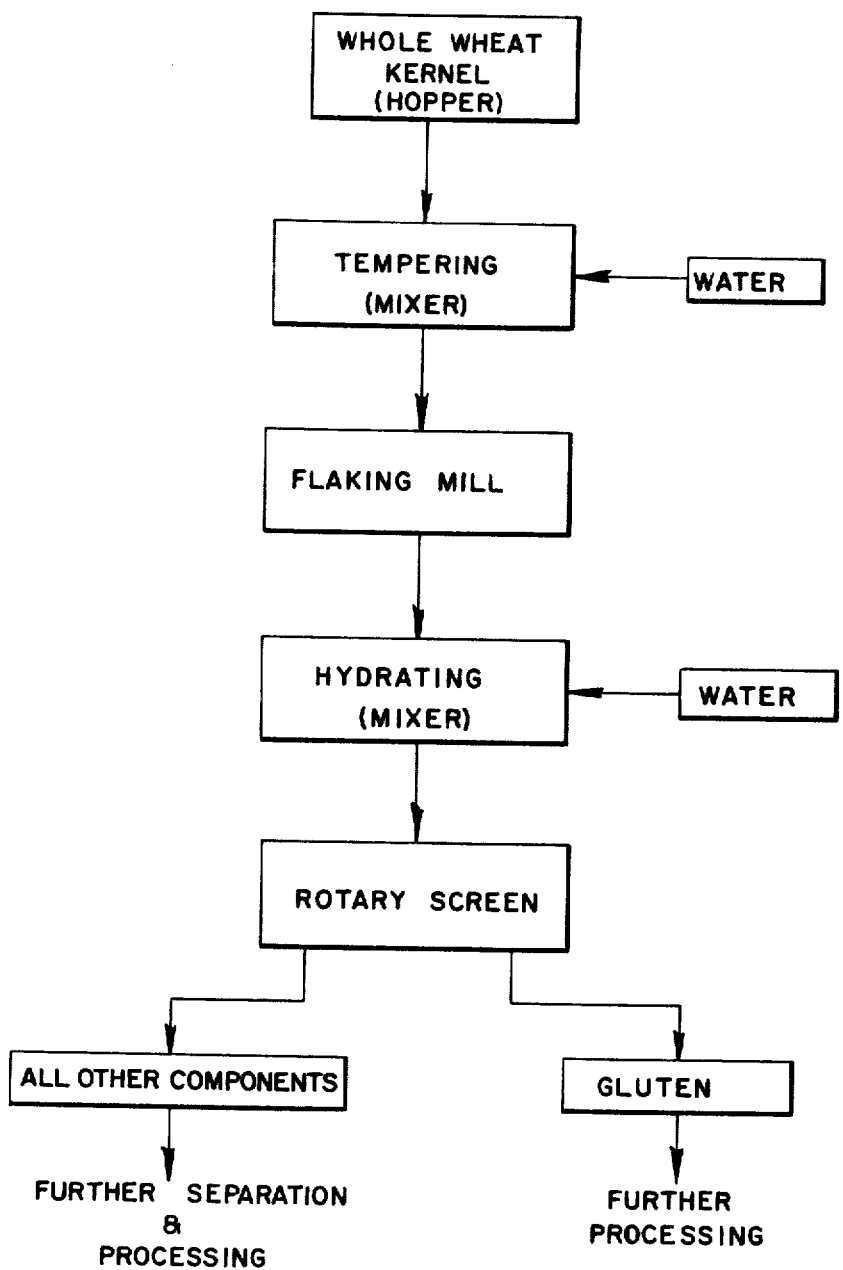
FIG. 1 is a block flow diagram of one form of the present process.

Tempering is preferably employed in one embodiment of the present process (see FIG. 1) to increase the moisture content of the kernel to no more than about 22% water by weight, although tempering to about 16–17% moisture has been found to be optimum. If the moisture content of the kernel is increased to beyond 22% by weight at this early stage of the processing, the possibility of microbial growth is substantially enhanced.

Increasing the whole wheat kernel moisture content to at least about 15% is necessary as a preliminary to the flaking step wherein the kernel is effectively reduced in particle size. Unless the kernel moisture content is at least 15% prior to flaking the germ will be damaged during particle size reduction. Moreover, the present process is fundamentally a whole wheat kernel component separation process. As such, it is particularly desirable to maintain the bran intact, i.e. to avoid shattering the bran, since separation of small bran particles from the other kernel components is an extremely difficult task. Moisture content increase to above 15%, either by tempering or hydrating, insures that the bran maintains its physical integrity during subsequent flaking and therefore remains in a readily separable form.

Flaking may be accomplished in a conventional roller mill, having clearances from 0.001 to 0.05 inch. While the ultimate particle size resulting from the flaking is immaterial, it has been found that flakes having thicknesses from 0.0005 to 0.025 inches may be satisfactorily processed in accordance with the present process. Flaking is a well known processing step and, as used herein, contemplates processing in commercially available equipment, such as roller mills, under conditions known to be conducive to flaking. Flaking is preferable to other forms of particle size reduction, such as grinding, because it has been found to be extremely difficult, as a practical matter, to subsequently remove the bran from the extremely small particles of ground wheat.

Following particle size reduction, the flakes are hydrated and agitated to form a dough, i.e., to develop the constituent wheat gluten into a cohesive elastic mass. The hydrating water may vary in temperature between 34° F. and about 120° F., but preferably is in the range 70°–90° F. Physically, the gluten mass resembles a matrix including the wheat starch, wheat bran, wheat germ, wheat oil and other wheat kernel components therein. Hydration of the flaked kernel is an extremely critical step in the present process since it is control of the extent of hydration which allows effective component separation from the whole wheat kernel. Unlike prior art processes which utilized wheat flour as the starting material and which intentionally hydrated the flour with excess water (i.e. excess beyond the amount needed to saturate the flour) to form a thin, slurry-like dough, it is important when effecting component separation from the whole wheat kernel to hydrate with only limited quantities of water. In accordance with the present process, it is intended to hydrate the flakes just sufficiently to achieve saturation, with the objective of forming a thick, dough-like mixture having no excess water, i.e. no water beyond that required to saturate the flakes. In this connection the words "just saturated" or the like are intended to describe this dough-like mass or mixture containing no excess water. The amount of water added to hydrate the flakes is therefore very important. It has been observed that use of more than the hereinafter prescribed quantity of hydrating water forms a slimy slurry with the whole wheat flakes from which subsequent component separation is largely ineffective.

The object of the hydration step is to just saturate the flakes to form a thick, cohesive mixture or mass with no excess water present. It will be appreciated that the quantity of water necessary to accomplish this will vary depending upon the moisture content of the flakes as well as upon the saturation limit of the particular type of wheat kernel (in the range 45–55%). Thus, for flakes which have moisture contents in the range 11 to 22%, by weight, the amount of hydrating water necessary to just reach saturation varies from about 65 to 75% by weight of the flakes to be hydrated. Addition of more than 75% water is to be scrupulously avoided lest a thin slurry result from which component separation is inefficient. Less than 65% water will generally be insufficient to achieve saturation. Generally, hydration of the flakes from an initial moisture content of 11 to 22% to final saturation moisture content, with mixing about every hour, requires from 15–20 hours at room temperature.

Figure 2:
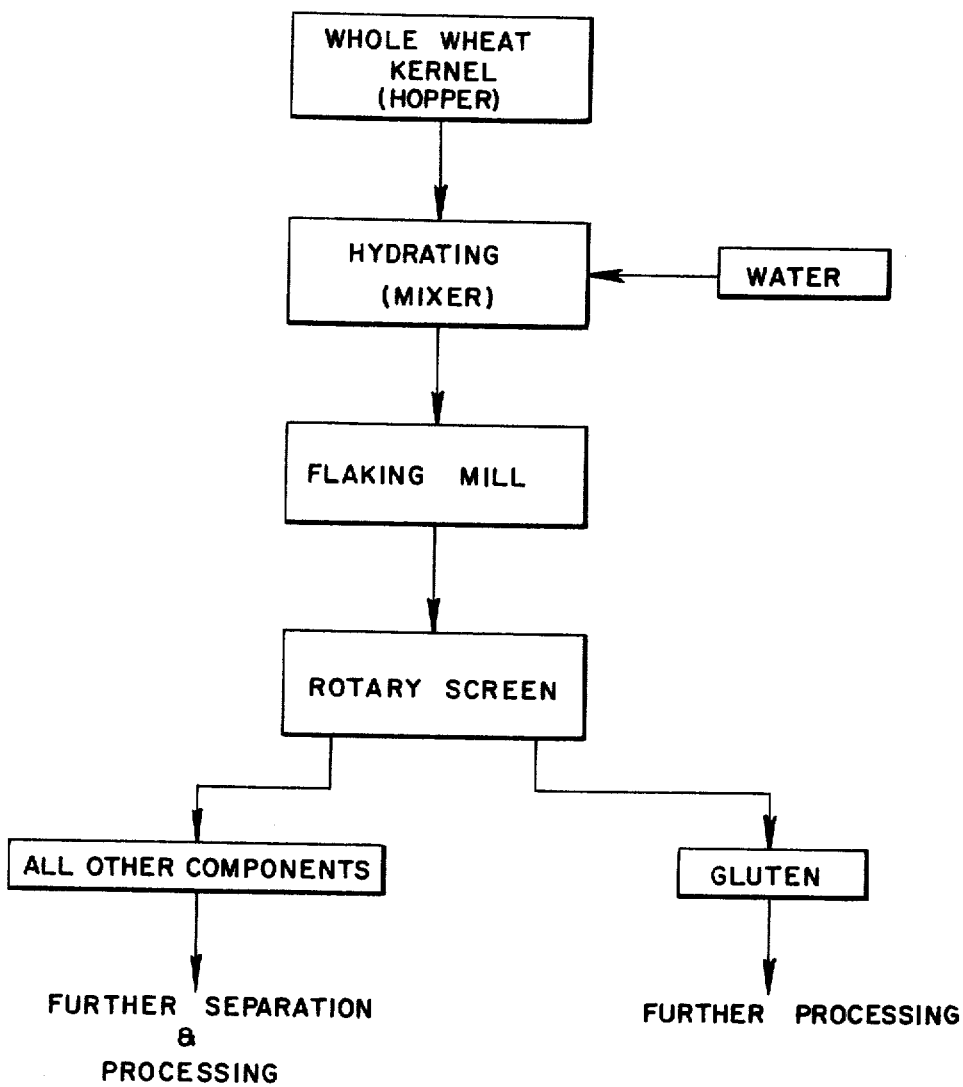
FIG. 2 is a block flow diagram of another form of the present process.

An alternative to processing the whole wheat kernel by tempering, flaking and then hydrating to saturation (see FIG. 1) is to hydrate the whole wheat kernel to saturation prior to flaking (see FIG. 2). In other words, instead of utilizing three distinct process steps to achieve a just saturated, dough-like mass, a two-step procedure may be substituted. An obvious advantage of the two-step process of hydrating followed by flaking, is the time and cost savings incident to eliminating the tempering step. However, as hereinbefore indicated, the presence of substantial amounts of moisture (greater than about 22%) in the whole wheat kernel for extended periods of time encourages microbial growth within the kernel, and is therefore undesirable, unless steps are taken to control or inhibit the growth.

Separation of the thick, dough-like mass into its components, and particularly the separation of the gluten therefrom, is accomplished by mechanically working the mass while it is partially or completely submerged in water. By this technique, the relatively large, hydrated gluten particles and fibers may be physically separated from the other wheat kernel components. For example, a preferred manner of manipulating or working the mixture is to place it in a rotary screen or drum-type separator having internal flights and lifters to convey and tumble the mass of wheat components along the horizontal axis of the rotating screen or drum. Alternatively, the gluten may be separated from the other whole wheat kernel components by use of conventional vibrating screens or other techniques well known to the art.

The rotary screen or drum preferred for use in the present process has perforations therein ranging from about 5/32 to 7/32 inches in diameter, and is housed in a container filled with wash water at a temperature in the range 60°–90° F., and preferably about 80°–85° F., such that at least a portion of the screen or drum is always submerged. As the screen or drum rotates and the mass of whole wheat components are mechanically manipulated by constant tumbling caused by the flights and lifters, the starch, bran and other non-gluten wheat components are washed from the hydrated gluten and pass in the wash water through the perforations (i.e. they are filtered) into a holding tank for subsequent further separation and purification by conventional techniques well known to the art. If the wash water temperature exceeds about 90° F. the gluten becomes slimy and difficult to recover. At wash water temperatures below about 60° F. the gluten becomes tough and the bran adheres to it. The vital wheat gluten is retained on the screen or in the drum and is recovered therefrom for further processing by conventional methods. For example, following separation from the other components of the whole wheat kernel, the hydrated gluten must be carefully dried to preserve the gluten in vital form. Exemplary of the numerous suitable drying techniques are vacuum tray drying, flash drying, spray drying and extrusion drying.

While the present invention has been described with reference to particular embodiments thereof, it will be understood that numerous modifications may be made by those skilled in the art without actually departing from the scope of the invention. Accordingly, all modifications and equivalents may be resorted to which fall within the scope of the invention as claimed.

What is claimed as new is as follows:

1. A process for separating wheat gluten from the nongluten components of the whole wheat kernel comprising the steps of:
   a. tempering whole wheat kernels in water to a moisture content, by weight, in the range from 15 to 22%;
   b. flaking the whole wheat kernels to a flake thickness in the range from 0.0005 to 0.025 inches;
   c. hydrating the flakes in a quantity of water from 65 to 75% by weight of the flakes and agitating the flakes and water to form a thick, dough-like mass; and
   d. mechanically working the dough-like mass in the presence of water to wash the non-gluten wheat kernel components from the gluten.

2. A process, as claimed in claim 1, wherein said wheat kernels are tempered to a moisture content of from 16 to 17% by weight.

3. A process, as claimed in claim 1, wherein said mechanical working is accomplished by rotary tumbling of said mass.

4. A process, as claimed in claim 1, wherein said non-gluten wheat kernel components are retained in the wash water and are separated from the gluten by filtration.

5. A process, as claimed in claim 1, including the additional step of drying the gluten after separation thereof from the non-gluten components.

6. A process for separating wheat gluten from the non-gluten components of the whole wheat kernel comprising the steps of
   a. tempering whole wheat kernels in water at a temperature from 70°–90° F. to a moisture content, by weight, in the range from 15 to 22%;
   b. flaking the whole wheat kernels to a flake thickness in the range from 0.0005 to 0.025 inches;
   c. hydrating the flakes sufficiently to just achieve saturation in a quantity of water ranging from 65 to 75% by weight of the flakes to be hydrated and agitating the flakes and water to hydrate the gluten and to form a thick, dough-like mass; and
   d. tumbling said mass over projections in a rotary drum having perforations therein while concurrently washing said mass with water at a temperature in the range 60°–90° F., whereby the hydrated gluten is retained in said drum and the non-gluten wheat kernel components are washed through the perforations.

* * * * *